Sept. 12, 1939.   W. G. HOELSCHER   2,172,999
ELECTRICALLY CONTROLLED AUTOMATIC LATHE
Filed Jan. 31, 1938   8 Sheets-Sheet 1

INVENTOR.
BY William G. Hoelscher
Wood & Wood
ATTORNEYS

Sept. 12, 1939.  W. G. HOELSCHER  2,172,999
ELECTRICALLY CONTROLLED AUTOMATIC LATHE
Filed Jan. 31, 1938  8 Sheets-Sheet 3

INVENTOR.
William G. Hoelscher
BY Wood & Wood
ATTORNEYS

Sept. 12, 1939.　　　W. G. HOELSCHER　　　2,172,999
ELECTRICALLY CONTROLLED AUTOMATIC LATHE
Filed Jan. 31, 1938　　　8 Sheets-Sheet 5

INVENTOR.
William G. Hoelscher
BY Wood & Wood ATTORNEYS

Sept. 12, 1939.  W. G. HOELSCHER  2,172,999
ELECTRICALLY CONTROLLED AUTOMATIC LATHE
Filed Jan. 31, 1938   8 Sheets-Sheet 6

INVENTOR.
BY William G. Hoelscher
Wood & Wood ATTORNEYS

Patented Sept. 12, 1939

2,172,999

UNITED STATES PATENT OFFICE 2,172,999

ELECTRICALLY CONTROLLED AUTOMATIC LATHE

William G. Hoelscher, Norwood, Ohio, assignor to The American Tool Works Company, Cincinnati, Ohio, a corporation of Ohio Application January 31, 1938, Serial No. 187,786

40 Claims. (Cl. 82—21)

This invention relates to machine tools, and is particularly directed to an automatic mechanism for directing and controlling the movements of the tool relative to the work. More particularly described, the invention relates to the art of directing the tool in a predetermined, controlled path, relative to the work, i. e., a shaft to be turned, and thereby effective for turning a series of counterturns on the shaft with no attention from an operator other than the initiation of a given cycle of operation.

Automatically operated and controlled lathes are disclosed in the prior art, see, for example, the patents to Shaw, No. 2,032,598, issued March 3rd, 1936 and Bickel, No. 2,055,227. However, these patented mechanisms have required a complete reorganization of the conventional lathe parts, with the result that the operator has not been able to operate the lathes under standard or conventional practice.

It has been the objective of the present inventor to provide an electro-mechanical mechanism for automatically operating and controlling the movements of the tool of the lathe. This mechanism is conveniently applicable to the conventional lathes without material alteration and, therefore, makes it possible for the operator, by simple disconnection to eliminate the automatic features and permit standard or conventional operation. Toward this accomplishment the improvement consists of electrical devices, mounted on the carriage and bed of the lathe in association with the standard mechanical parts of the lathe, for operating these parts in a controlled cycle. Some additional structures are incorporated in connection with the slide movement, but, since means are provided for disconnecting the automatically controlled power drive from the slide, these additional structures do not interfere with the feeding of the tool in and out of the work in the conventional manner.

It has been a further objective of the present inventor to provide a mechanism, operated by the slide, for automatically indexing a stop device in order to limit the infeed of the tool. The arrangement resulting from this objective and disclosed herein distinguishes over the automatic lathes of the past in that it provides a positive stop for limiting infeed of the tool. The inward movement of the slide is stopped by direct encounter of the slide with a positive stop, rather than by switches. The stalling of the motor which results from this is used for the purpose of controlling an electrical mechanism which causes reclutching of the carriage feeding mechanism and for disconnecting the electric energy to the cross slide motor. This arrangement has a distinct advantage in that the tool is brought up to the cutting point with absolute accuracy, there being no possibility of its moving across or beyond the proper terminal of inward movement.

It has been a further objective of the present invention to provide, in conjunction with the present automatic mechanism, and independently directed and controlled carriage return power means, involving its own circuits and independent motor. This mechanism is arranged so as to prevent coupling of the carriage return motor when the feed rod is clutched to the feed-box mechanism.

It has been a further objective of the invention to provide means for initiating a cycle of operation by manually setting a device at an indicated position, whereupon the entire cycle of movement will follow, ultimately returning the tool to starting position.

These objectives and improvements over the prior art have resulted in an embodiment of the invention, which operates as follows: The operator moves the hand wheel to a position marked "Start". This movement completes the circuit to the cross slide motor, whereupon it moves into the proper depth for the first counterturn. A positive stop, indexed into position by the operation of setting the starting device, positively stops the slide, stalls the motor, and causes clutching of the feed to the carriage. The carriage is then traversed for feeding the tool along the work. This movement is discontinued when the carriage engages a stop dog and declutches the feed to the carriage. The declutching of the feed moves a switch and circuits are connected for causing outfeed movement of the slide motor. When the slide reaches its outer limit of movement, it operates a switch and, at the same time, indexes the slide stop mechanism which is for the purpose of setting up the next stop for limiting slide infeed. At this time the slide motor is reversed and slide infeed again begins. These phases of operation will continue until the last carriage stop dog is reached. At this time a carriage return motor is placed in circuit, and the feed rod is declutched at the same time. The carriage is then rapidly regressed past the first stop dog. Thereupon, the feed rod clutch is thrown in, and the clutch moves back against the first stop dog. The result, at this time, is to disconnect all circuits, since the cycle initiating device is moved to circuit breaking position.

Other objects and certain advantages will be more fully apparent from a description of the drawings, in which.

The automatic mechanisms for directing and controlling the movements of the tool in relation to the work, are embodied in a lathe of the following general description:

A lathe bed 30 is supported on base members or legs 31. The tool 32 is adjustably mounted in a tool holder 33, supported on a cross-slide 34. The slide is mounted for lateral adjustment on a carriage 35. The carriage is slidably supported on longitudinal ways 36, formed integrally with the lathe bed. The work 37 is supported between the respective spindles 38 and 39 of the headstock 40 and the tailstock 41.

An electric motor 42 drives the headstock gearing through pulleys and belting (not shown), contained in the casing 43. The carriage is translated along the ways of the bed by means of a feed rod 44, extending along the forward side of the lathe bed and driven from the gearing in the headstock through a feed box 45. The gears driven by the feed rod are contained within the lathe apron 46 and include a pinion 47, in mesh with the stationary rack 48, fixed along the underside of the forward way of the lathe bed. The feed rod is also driven by means of a rapid return motor 49 for returning the carriage. The slide is moved laterally for adjusting the tool toward and from the work by means of an electric motor 50, driving a cross-screw 51 traversing the nuts 52 of the slide. The slide carries control means 53 (see Figure 12) for the cross-slide motor, which controls the outward movement of the slide and a synchronously operated slide stop indexing means 54. A multiple stop unit 55 is mounted on the carriage and is automatically reset by the means 54 for controlling the infeed movements of the tool slide.

The feeding movements of the carriage are controlled by a series of stops 56, operating a shifter bar 57, disconnecting the feed to the carriage.

The rapid return motor 49 for the carriage is controlled by means of switch mechanism at the tailstock end of the lathe, operative at either end of the full carriage movement. The various operating means and the control mechanisms, that is, the slide outfeed control mechanism, the slide infeed control stops, the carriage feed control dogs, and the carriage return motor control switch, are electrically and mechanically coordinated to provide for a full, automatic cycle of operation of the lathe for a given piece of work. After the work is inserted in the lathe, the full cycle may be instituted by setting a hand wheel 59 (see Figure 12), which operates a cycle control switch 60, whereupon a series of shoulders may be cut on the work and the tool returned to original position without further attention on the part of the operator.

In order to disclose the respective mechanisms, each operating means and its control will be described with only general reference to the complete cycle or the coordination of the various mechanisms, and a detailed description of the full cycle will then be given.

Tool slide operating means

Figures 5, 6:
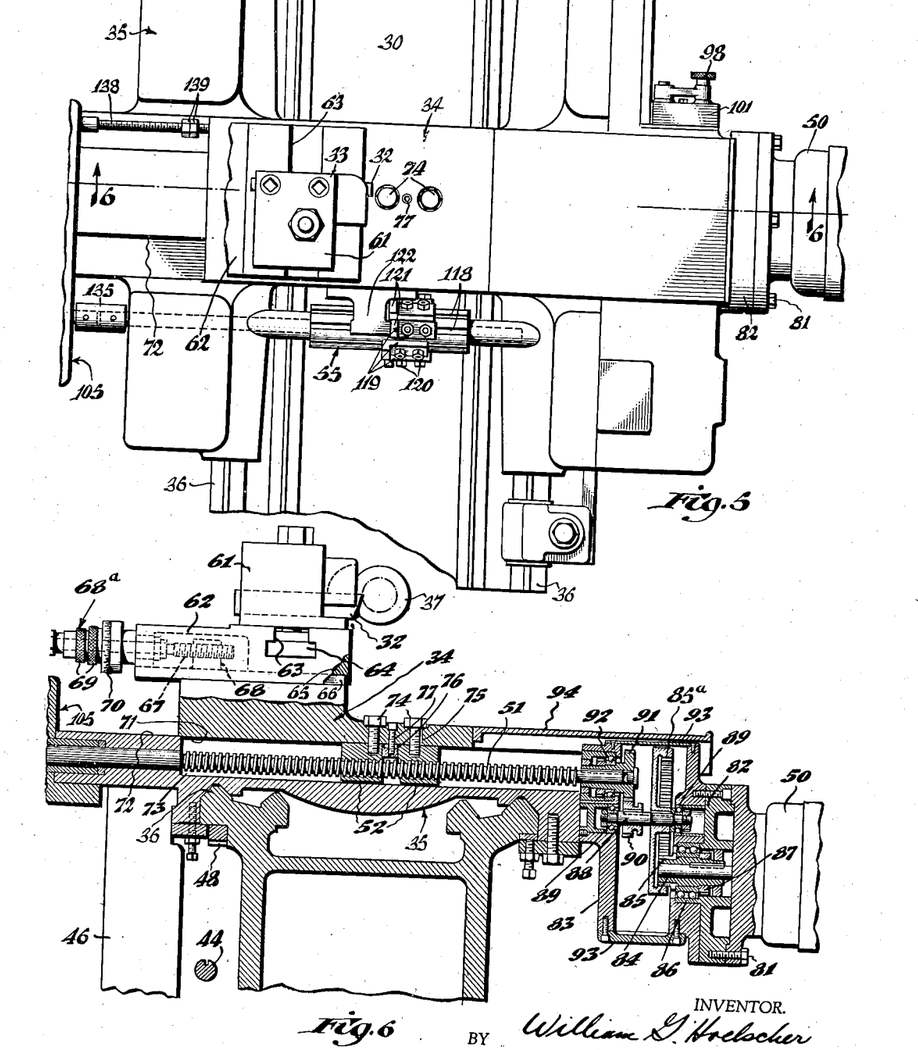
Figure 5 is an enlarged fragmentary top plan view of the lathe, further illustrating the carriage.
Figure 6 is a sectional view taken on line 6—6, Figure 5, detailing the slide translating mechanism.

The tool 32, as stated, is adjustably mounted in a tool holder 33. Referring to Figure 6, the tool holder consists of an element, 61, directly supporting the tool, including a socket for this purpose. This element is adjustable longitudinally of the work. Another element 62 is mounted directly upon the slide for lateral adjustment, that is, adjustment crosswise, relative to the work. The element 62 includes a T-slot 63 disposed longitudinally of the lathe, across the top of the element. The element 61 is fastened upon the top surface of this member by means of T-bolts 64, fixed through the element 61 and having their heads engaged in the T-slot.

The element 62 includes a dovetail portion 65, disposed in a dovetail groove 66, lengthwise of the slide. The tool holder element 62 is adjusted in the dovetail groove 66 by means of a screw 67, traversing a lug 68 of the slide. A micrometric adjustment means 68a is provided for the screw, including manipulating knobs 69 and graduated dial members 70. This adjustment means, per se, forms no part of the invention and, therefore, is not described in detail.

Figure 9:
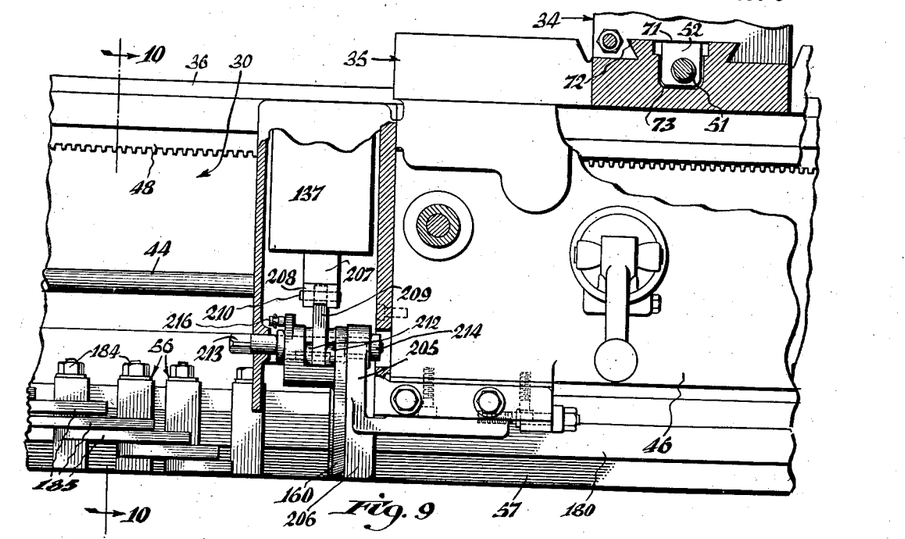
Figure 9 is an enlarged, partially sectional, fragmentary view of the front of the lathe, illustrating the control means for stopping the feeding movements of the carriage.

The slide 34 includes a dovetail groove 71 along its underside, which is engageable on a dovetail portion 72 across the top of the carriage (see Figures 6 and 9). The pair of nuts 52 depend from the slide; specifically, they depend from the underside of the dovetail groove into a cross clearance groove 73, extended parallel with and centrally of the dovetail portion of the carriage. The cross slide feed screw 51 lies longitudinally within this groove and is suitably journalled at the front and back of the carriage. The screw traverses the pair of nuts and thus moves the cross-slide for feeding the tool in relation to the work.

The nuts are secured to the slide by means of screws 74 inserted from above the slide. The back nut is adjustable longitudinally of the screw. To permit this, the retaining screw for the back nut is disposed through a longitudinal slot 75. A wedge 76 lies between the nuts and has a slanting, back face lying against the slanting, forward face of the back nut. This wedge is pulled upwardly by means of a screw 77, forcing the back nut rearwardly and taking up any clearance between the threads of the screw and the threads of the nuts.

The cross-slide screw 51 may be adjusted by means of a hand wheel 78, fixed to its forwardly projected end, and its position may be micrometrically adjusted and calculated, through knobs 79 and dials 80. The specific arrangement of the adjustment means is not discussed herein, since it forms no part of the present invention. The essential element here is the hand wheel 78 manually turning the screw and manipulating the slide for setting the various dogs of the cross-slide control unit 55.

The screw is driven from the electric motor 50, at the back end of the carriage, through the following mechanism. The electric motor is secured to the slide structure by means of screws 81. These screws attach the motor to a circular plate element 82, fixed to the rear side of a housing member 83, which, in turn, is fixed to the slide 34. The motor shaft 84 projects through the plate 82 into the casing and has a pinion 85 keyed thereto. The pinion 85 is rotatably journalled in a double ball bearing 86 and is fixed to the inner race thereof by means of a nut 87 engaging the inner race against the shoulder of the pinion. This pinion 85 is in mesh with an internal gear 85a keyed to an intermediate transmission shaft 88. The shaft has its respective ends journalled in ball bearings 89—89, fixed in the respective end walls of the casing. A shiftable gear 90 is slidably keyed to this shaft and is in mesh with a gear 91 keyed on the rea rend of the cross slide screw 51. This gear is journalled in the forward wall of the casing in a bearing 92 in the same manner as that described for the pinion 85. Top and bottom closure plates 93, for the transmission casing, are provided for access to the gears inside the casing. A cover plate 94 is fixed to the cross slide, extending rearwardly and overhanging the rear end of the screw and the slide transmission casing 83.

Figures 18, 19, 20:
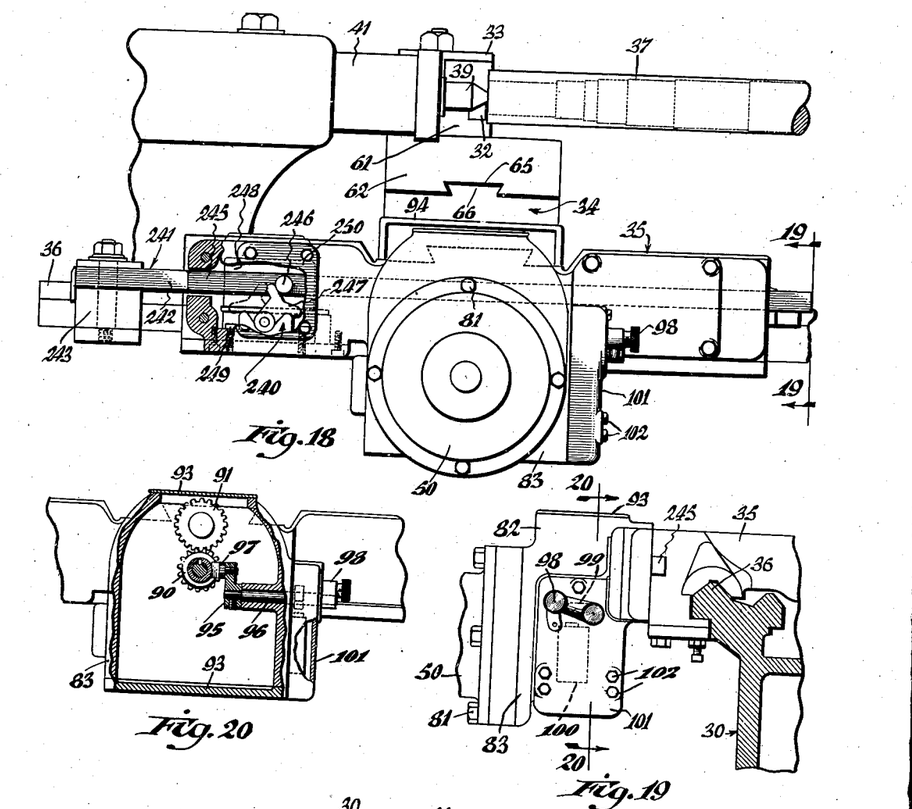
Figure 18 is a view looking toward the back of the lathe and showing a portion thereof, particularly illustrating the rapid return control switch for the carriage.
Figure 19 is a sectional view taken on line 19—19, Figure 18.
Figure 20 is a sectional view taken on line 20—20, Figure 19, illustrating the combination slide motor declutching means and circuit breaker.
Figure 21:
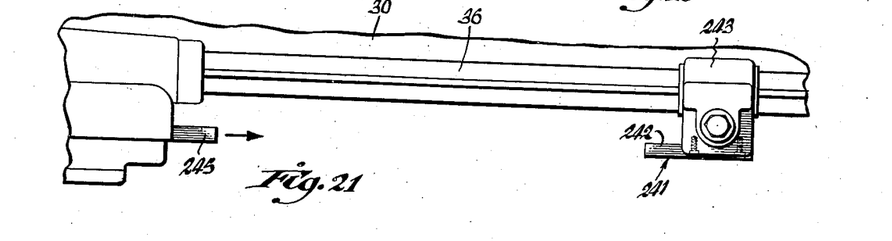
Figure 21 is a fragmentary plan view, showing the stops for actuating the switch element which controls return movement of the carriage.

As shown in Figures 19 and 20, the slidable gear 90 is translated for disconnecting the power from the cross-slide screw 51 when desired. An arm 95 is fixed on the inner end of a control shaft 96, which carries a rotatably mounted shifter element 97 on its outer end. The shifter element is engaged in the groove of the shiftable gear. The outer end of the shaft carries the shifter lever 98. The control shaft also carries a switch-operating finger 99, engageable with the operating element of an electrical switch 100. These switching mechanisms are contained within a casing 101 secured against the side of the transmission casing, by means of screws 102. The switch 100 has the function of disconnecting the entire electrical circuit when the cross-slide screw 51 is disconnected. This eliminates the automatic control and makes it possible to operate the lathe in the usual manner.

*Electro-mechanical control for the slide movement*

The switch 60, which initiates the cycle of operation, is mounted on the carriage. This switch is operated by the hand wheel 59. The hand wheel 59 is fixed on the outer end of a shaft 103. The shaft 103 is journalled in a bearing 104, which is part of the casing 105 housing the slide movement controlling mechanism. The hub of the hand wheel and the outer end of the bearing include complementary or registering indication marks. The hand wheel has the word "start" printed adjacent its indication mark. When these marks are in registration, the switch 60 is closed, and the circuit to the slide motor is connected.

Figures 12, 13, 14, 15, 16, 17:
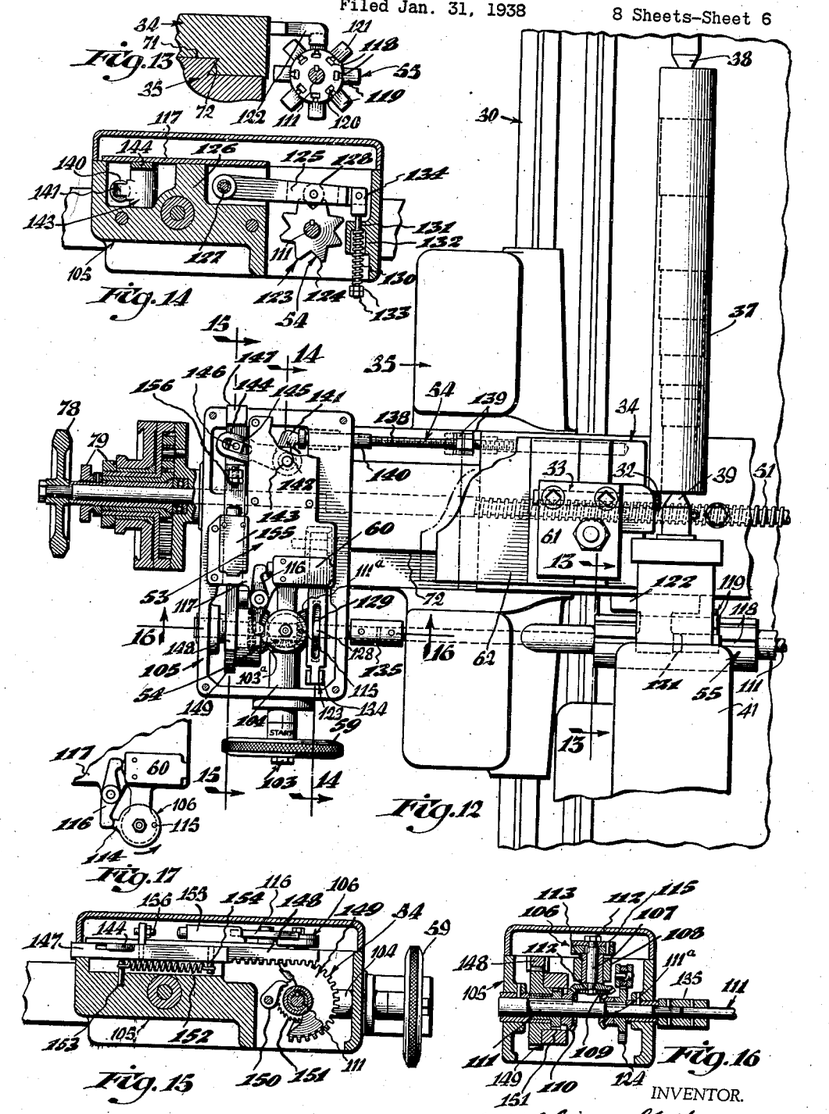
Figure 12 is an enlarged, fragmentary, partially sectional view, looking down upon the lathe and illustrating the details of the slide control mechanism.
Figure 13 is a sectional view taken on line 13—13, Figure 12, detailing the rotatable stopping means for limiting the infeed of the slide.
Figure 14 is a sectional view taken on line 14—14, Figure 12, detailing the detent means for centering each slide stop dog.
Figure 15 is a sectional view taken on line 15—15, Figure 12, detailing the slide stop dog resetting means.
Figure 16 is a sectional view taken on line 16—16, Figure 12, further detailing the mechanism of Figure 15.
Figure 17 is a diagrammatic view, illustrating the cycle initiating and terminating switch in opened position.

As shown in Figure 16, a disk 106 is fixed on the upper end of a stub shaft 107, which is journalled through a bearing lug 108 of the casing 105. A bevel gear 109 on the lower end of the shaft 107 meshes with a bevel gear 110 fixed on the shaft 111 carrying the slide stop device 55.

The inner end of the hand wheel shaft 103 is provided with a bevel gear 103a in mesh with a bevel gear 111a, secured on the shaft 111. Manipulation of the hand wheel, therefore, rotates the shaft 111 which, in turn, actuates the disk 106. The disk 106 and the bevel gear 109 are fixed upon the shaft by means of nuts 112, which draw these elements together upon a sleeve 113 surrounding the shaft within the bearing 108. The disk is in two sections, the upper plate section including a cam lug or projection 114. A pin 115 is disposed through and holds against relative rotation the plates of the disks.

A switch actuating lever 116 is fulcrumed on a support plate 117 of the casing and has one contact end riding upon the periphery of the control disk and the other contact end engaging the plunger of the switch 60. The disk rotates counterclockwise, as shown in Figure 17, and the approach side of the lug 114 is rounded to procure the proper lifting action on the lever.

The stop dog device 55 is in the form of a cylinder fixed on the shaft 111. The shaft 111 is journalled in the carriage, parallel to the ways of the slide and alongside thereof. The cylinder includes longitudinally disposed circumferentially spaced T-slots 118, of which there are eight in the present instance. Stop dogs 119 are fixed upon the drum by means of T-bolts 120, engaged in the respective slots. These stop dogs provide forward, radially projected abutment ends 121 adapted to be engaged by the stop 122 of the slide (see Figures 5 and 13). If eight shoulders are to be turned on the shaft, eight stop dogs 119 are used.

This stop dog cylinder is rotated or indexed by the movement of the slide in its final outward phase. As shown in Figure 14, a detent device 123 is provided for centering the respective stop dogs in relation to the fixed stop of the slide. This detent device includes a star disk 124, which is keyed on the shaft. A lever 125 is pivoted within a lug 126 of the casing upon a pin 127. A roller 128 is provided, intermediate of the length of the lever, within a longitudinal slot 129 thereof, and engaging the star disk. The roller is held in contact with the disk by means of a coil spring 130, surrounding a rod 131 and under compression between the lug portion 132, in which the rod is mounted, and a pair of nuts 133 at the outer end of the rod. The rod is pivotally mounted on the outer end of the lever, by means of a yoke 134. Thus, a snap action is provided, causing the stop cylinder to assume positions definitely aligned with the stop of the slide, since the roller will snap into the notches of the star disk as long as the movements of the disk are sufficient to carry it past the top of one of the points.

Figure 22:
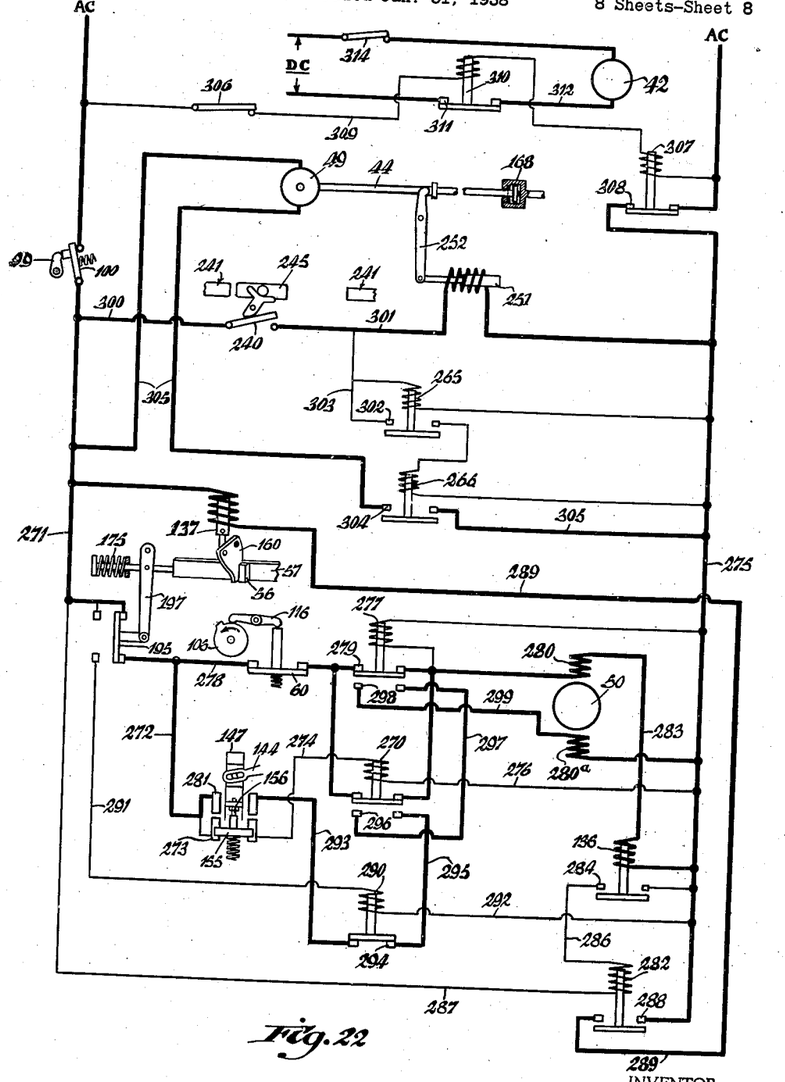
Figure 22 is a wiring diagram, showing the various circuits, the electrical devices, and the mechanical devices employed in the automatic control apparatus of this invention.

A coupling 135 connects the section of the shaft 111, which is journalled in casing housing the mechanism, and the shaft section which carries the stop dog device. Thus, when the hand wheel 59 is moved to starting position, the stop dog device 55 is rotated to place that stop dog 119, providing the first counterturn of the shaft, in alignment with the stop 122 of the slide. Engagement of the stop of the slide with a stop dog causes stalling of the motor 50. The motor current of the tool slide operating motor 50 is then increased to a value which is strong enough to close the contacts of instantaneous current relay 136 (see circuit diagram). This energizes a carriage feed control solenoid 137 and causes the longitudinal movement of the carriage through a control mechanism which will be described hereinafter.

The automatic indexing of the stop dog unit 55 is accomplished in the following manner: An actuating rod 138 is slidably supported in a bore in the outer face of the slide. This actuating rod is screw-threaded and provided with a pair of abutment nuts 139 adapted to be engaged by the outer face of the slide upon outward movement of the slide. The opposite end of the rod includes a sleeve 140, which is slidably mounted in the wall of the casing 105. The inner end of the sleeve 140 is headed and engages the outer end of one arm 141 of a bell crank lever 142 rotatably mounted upon a pin 143 in the plate 117. The other arm 144 has its outer slotted end engaged over a block 145, rotatably mounted on a pin 146 carried by a slide 147 movable across the casing.

The slide 147 includes a rack 148 meshing with a rack gear 149 loosely rotatably journalled about the shaft. The rack gear carries a pawl 150 pivoted adjacent the periphery of the rack gear and lying against its side. This pawl engages a ratchet wheel 151 keyed to the shaft. Specifically, described, the rack gear revolves upon the hub of the ratchet. A coil spring 152, under tension between a pin 153, fixed to the frame, and a pin 154, fixed to the rack bar, constantly urges the rack back to normal position, at which position the actuating rod 138 is shown in Figure 12. Accordingly, at each outward movement of the slide, the stop dog device is rotated or indexed to the next succeeding position for setting up the next stop dog.

At the same time, a switch 155 is operated by means of a contact element 156, which is located on the top of the slide for reversing the slide motor 50; whereupon, the slide will travel inwardly and encounter the next stop dog. Then the motor will stall, and the proper circuits will be energized for causing longitudinal feeding movement of the carriage.

*Electro-mechanical control for the carriage feeding movement*

Tool feeding movement of the carriage, that is, movement when the carriage is being fed longitudinally in the cutting operation, is automatically terminated at successive stages in the cycle by means of the stop dogs 56, which are adjustably attached to the stop dog bar 57. Certain of the carriage control mechanism disclosed herein is disclosed and claimed in applicant's Patent No. 2,074,961, granted March 23, 1937. Normally, the stop dog bar is held in clutch engaging position. The contact or trip element 160 on the carriage is electrically shifted, for disengagement from the particular stop dog, in order to permit the return of the stop dog bar to normal position and the consequent reclutching of the carriage feeding means and the continued feeding travel of the carriage until the next stop dog is encountered. The solenoid 137, which operates the abutment element 160, is controlled through the instantaneous current relay 136.

Accordingly, the abutment element of the carriage is automatically cleared with respect to the particular stop which has caused declutching of the carriage. As stated, this shifting of the abutment element occurs when the slide comes into contact with one of its stop dogs 56. The clutching and declutching of the carriage, with respect to the power, is accomplished through a mechanism which is somewhat similar to that disclosed in the patent, and which will be fully described herein as a part of the present invention. The bar 57 includes, along its rear side, a semi-dovetail portion 161, which is slidably mounted in corresponding slots 162, disposed across the forward faces of supporting blocks 163, which are attached to the underside of the bed by means of screws 164. A rigid shift arm 165 includes a foot portion 166 which is attached to the top face of the bar by means of screws 167. This shift arm has its upper end slidably engaged about the feed rod 44 for the purpose of shifting this rod when the stop dog bar is moved and thereby operating the clutch 168.

The clutch 168 includes clutching elements 169, 170. Element 169 is in the form of a collar, which has teeth on one end face that engage the corresponding teeth of the other element 170. The element 169 is pinned on the end of the rod 44. The element 170 consists of a disk fixed on the open end of a coupling 171, that is, pinned on the end of a power shaft 172, which projects from the feed box 45, in alignment with the feed rod. The collar element 169 moves within the chamber 173 of the coupling element. The feed rod is journalled in the disk 170. A collar 165a, pinned on the rod, is engaged by the arm 165, for moving the feed rod and disengaging the clutch elements 169, 170 against the action of the springs 174 and 175.

Figures 10, 11:
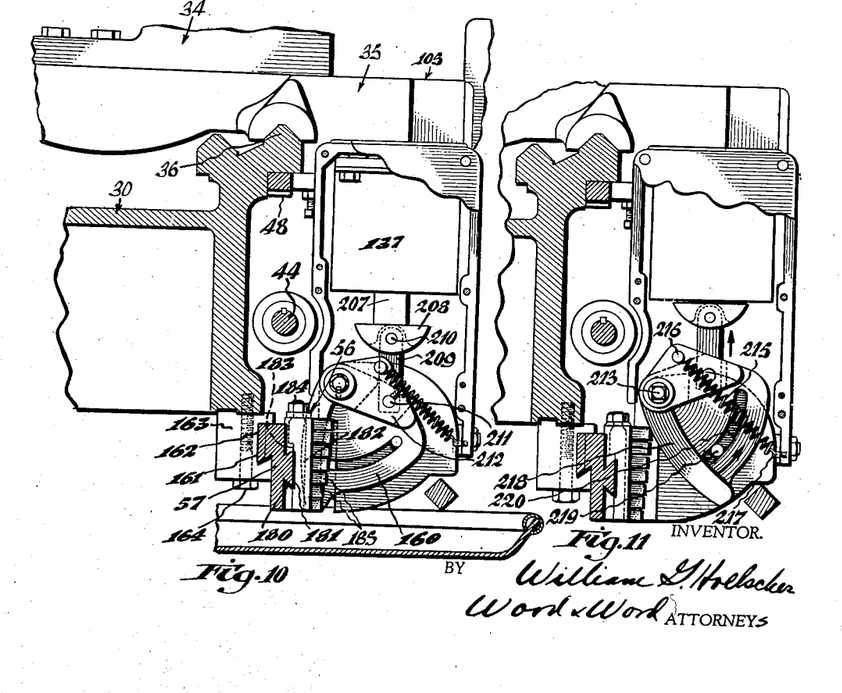
Figure 10 is a sectional view taken on line 10—10, Figure 9, further detailing the mechanism detailed in Figure 9.
Figure 11 is a view similar to Figure 10, but illustrating the carriage stopping mechanism moved to a position which permits further feeding movement of the carriage.

The outer face of the bar 57 is provided with a longitudinally disposed dovetail portion 180, upon which are adjustably mounted the stop dogs 56. The dogs include dovetail slots 181, slidably engaged on the dovetail portion of the bar. A suitable clamping bolt 184 is provided for each stop dog. This clamping bolt, in each instance, is extended vertically through the stop dog, crosswise to the dovetail portion. Each bolt includes a transverse slot 183 which is traversed by the dovetail portion of the bar. The lower end of the bolt is inclined in order that it may engage or hook under the lower inclined face of the dovetail portion. The bolt is held in this hooked position by means of a nut 184 on its screw-threaded upper end (see Figure 10).

Each of the stop dogs includes a contact arm 185 extending parallel with the bar and toward the tailstock end of the lathe. These contact arms thus provide ends disposed for engagement or contact by the trip or contact member 160 which is operatively mounted on the apron 46 of the carriage. The arms 185 of the respective stop dogs are disposed in different horizontal planes. The arm of the stop dog nearest the headstock is in the highest plane, and the remainder of the arms are stepped down in elevation progressively toward the tailstock of the lathe. Also, the outer longitudinal faces of these arms are in progressively set, back planes. These faces are set back starting with the stop dog nearest the headstock end of the lathe (see Figure 10).

Accordingly, if it should be desirable to turn shaft shoulders which are close together, the arms of adjacent stop dogs can be overlapped. The abutment element 160 on the carriage, when it is swung clear of, say, the first stop dog (after contact with the end of this dog and subsequent release), will drop down and rest against the forward longitudinal edge of the first stop dog and will ride along this edge until it comes into contact with the end of the second stop dog. This occurs even though the end of the second stop dog is within the extent of the first-mentioned arm, due to the previously described off-setting in vertical and horizontal planes.

Figure 7:
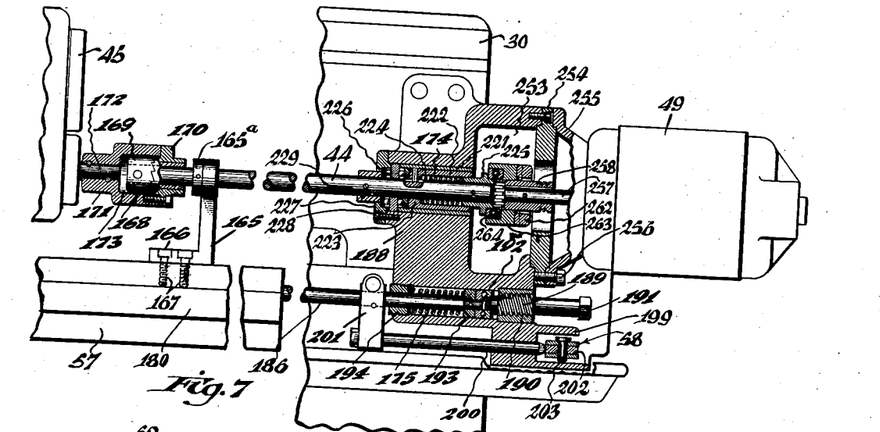
Figure 7 is an enlarged, partially sectional, fragmentary view, looking toward the front of the lathe and illustrating the driving and drive control mechanism for the carriage.

The tailstock end of the stop dog bar is in the form of a rod 186 (see Figure 7). This rod extends into and is mounted in a journal bracket 188 at the tailstock end of the lathe. Means is provided for actuating the bar independently of the stop dogs. This means is manual and consists of an actuator screw 189 extending through a nut 190, fixed in the journal bracket 188. The actuator screw includes an axial-headed extension 191 adapted for engagement by means of a wrench.

The counterturned, inner end of the actuator screw fits into an end thrust ball bearing 192. The ball bearing engages a thrust washer 193, which is fixed upon a counterturned portion at the end of the rod extension of the stop dog bar. The counterturned portion of the rod enters the ball bearing for the purpose of centering the parts. A plug 194 is screwed into the end of the bore opposite the end containing the nut 190. This plug supports the extension 186 of the bar 57. The coil spring 175 is disposed, under compression, between the plug 194 and the thrust collar 193, which encircles the rod, and constantly urges the stop dog extension rod 186 into contact with the actuator screw. As described heretofore, the spring holds the clutch on the feed rod, in engagement.

Figure 8:
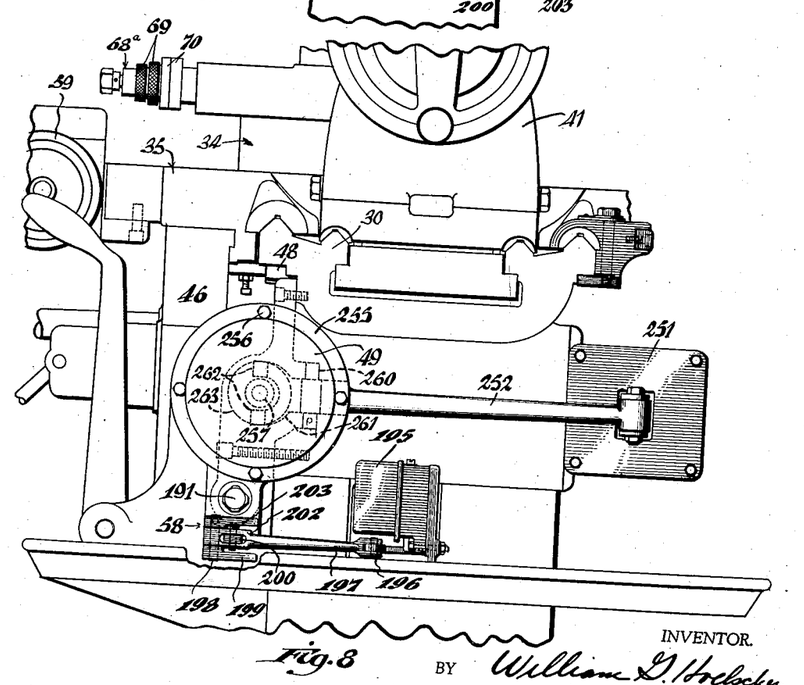
Figure 8 is a fragmentary view of the tail stock end of the lathe, illustrating particularly the electrical apparatus for controlling the movements of the carriage.

The switch 155 mounted on the carriage is a double throw switch. That is to say, it may be in one or the other of two contact closing positions, as shown in the diagram. The stop dog bar controls the movements of the tool slide, which, in turn, operates this switch, by means of the two-position switch 195 (see Figures 7 and 8). This switch is actuated by means of the stop dog bar, so as to be in one or the other position, dependent upon the position of the clutch 168, which controls the feed of the carriage.

The switch 195, just described, includes an operating arm 196. A pivoted lever 197, mounted on a pivot pin 198 in a lug 199 of the journal bracket, has its outer end connected to this contact arm 196. A shifter rod 200 is slidably mounted through the journal bracket parallel to the stop dog bar. One end of this rod is connected to the rod of the stop dog bar by means of a rigid arm 201. The other end is connected to the pivoted lever adjacent the pivot 198, by means of a flat end engaged into a slot 202 in the pivoted lever and held therein by a pivot pin 203. Thus, the point of actuation for the lever is adjacent the pivot. This provides increased movement at the outer end of the pivot lever, which movement is necessary to throw the switch properly. Due to the fact that the shifting movement of the stop dog bar and clutch 168 is relatively short, the leverage must be multiplied.

A bracket 205 pivotally supports the carriage abutment element 160. This bracket is adjustably mounted longitudinally of the carriage, as is fully disclosed in the previously mentioned patent. The specific adjustment means is of no moment in the particular case.

The outer end of the bracket provides a vertically disposed supporting flange 206 across the face of which the element 160 is swung. The plunger 207 of the solenoid 137 has a headed, lower end 208 that is bifurcated to receive the end of a link 209 which is held therein by a pivot pin 210. The other end of the link is attached to a pivot pin 211, extended between the main body, and a spaced parallel flange 212 of the element 160.

The pivot for the element is a long rod 213, extended in fixed position in the walls of the element 160 and journalled in the vertical flange of the bracket. Collars 214 hold this rod in position, and it further includes a squared portion formed on its outer end for swinging the abutment element 160 by hand. A coil spring 215 under tension between a pin 216 on the outer flange element, adjacent to and above the pivot, and a pin 217, attached to the casing which houses the solenoid, holds the abutment element in normal position for abutment, that is, in line with the stop dogs. The stop dog element includes an arcuate, contact boss 218, adapted to engage any of the stop dogs. A stop pin 219 projects from the flange 206. This pin is engaged within a slot 220, which is arcuate on a radius taken from the center of the pivot 213. Abutment of the outer end of the slot with the pin defines the limit of movement of the element across the planes of the stop dogs.

The amount of movement of the clutch element 169 will be apparent from an inspection of Figure 7. The clutch is shown engaged in this view. Disengaging movement of the clutch will move the element 169 within the clearance afforded by the chamber.

A sleeve 221 is fixed within the bracket 188. This sleeve rotatably and slidably journals a spring retaining sleeve 222, which is in splined connection with the shiftable feed rod 44. The spring retaining sleeve is counterbored to provide a shoulder 223 at its inner end. Within the chamber afforded by the counterbore, a coil spring 224 is mounted and is held under compression between the shoulder and a collar 225 pinned to the outer end of the feed rod.

An end thrust, bearing assembly is provided. This assembly provides two sets of end thrust ball bearings 226. One end race of these sets is engaged within the sleeve and against the end of the spring retainer sleeve 222. The intermediate race is of larger diameter and lies against the end of the first-mentioned sleeve or bushing 221. A cap 227 contains the other end race. This cap includes a boss portion engaging central race and clamping it in position. The cap is held in position by means of screws 228.

The shift movement limiting collar 229 for the feed rod is pinned to the rod for abutment with the closure cap. Accordingly, when the feed rod is moved toward the feed box for declutching, the spring is further compressed. The spring will, upon release of the shift rod, promptly shift the rod to normal clutch engaged position with the collar lying against the closure cap as shown. The spring retainer element and the outer ball races rotate with the shift rod.

Figure 4:
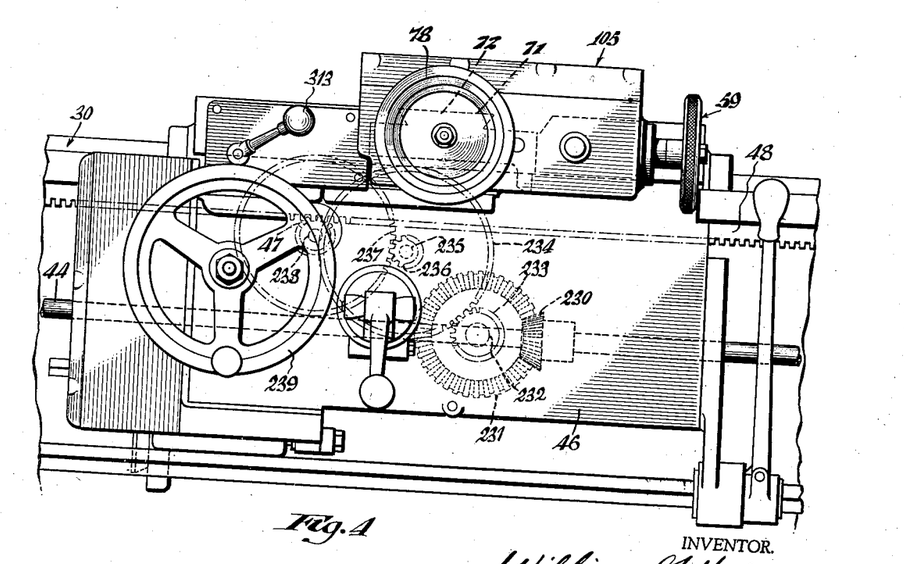
Figure 4 is an enlarged fragmentary front view of the lathe, illustrating the carriage.

The feed rod 44 drives the carriage through the following transmission arrangement which will be found in the apron of the carriage, as illustrated in Figure 4. A bevel pinion gear 230 is held against longitudinal movement on the carriage and is in splined connection with the feed rod. This gear is in mesh with a bevel gear 231 fixed on a shaft 232. This shaft 232 carries a pinion gear 233 in mesh with a large gear 234, mounted on another shaft 235, which shaft, in turn, includes a pinion gear 236 meshing with another large gear 237 fixed on the shaft 238, which in turn carries a rack gear 47 meshing with the rack 48 disposed along the lathe body. A hand wheel 239 is provided on the lathe apron for moving the carriage by hand when the power drive to the carriage is disconnected.

Accordingly, it will be seen that the feed rod moves the carriage along the ways of the bed in turning operations on the work, and the power connection to the rod is disconnected by longitudinal translation or axial movement of the rod, which movement is accomplished through the stop dog bar and the rigid arm 165.

*Electro-mechanical control for rapid return of the carriage*

Along the back of the lathe is the switch 240 and switch control mechanism for controlling the operation of the rapid return motor 49. This embodies adjustable stops 241—241, mounted adjacent the headstock and the tailstock. Each of these adjustable stops includes an arm 242, and these arms are projected toward each other and in alignment. Further, the arms are mounted on brackets 243 adjustably fixed on the way 36. A switch shifting bar 245 is slidably mounted in the carriage at the rear thereof. The ends of the bar 245 respectively engage the limit stops.

As illustrated in Figure 18, this shifter bar carries a pin 246 projecting laterally from one side thereof and adapted to engage the bifurcated arm 247 of a snap switch mechanism which is part of the rapid traverse return motor control switch 58. The switch is fixed within a chamber 248 of the carriage by means of screws 249, and a cover plate 250 is included over the chamber for access to the switch. This switch is of the type which may be operated first from one side and then from the other. As shown, it has just been tripped to stop the return motor, and the carriage has been returned to starting position at the end of the cycle. This switch 240 energizes a solenoid 251 which is connected (see Figure 8), by means of a lever 252, to a clutch shifter at the outer end of the feed rod.

More specifically described, the structure at this point is as follows: A chamber 253 is provided in the journal bracket 188, housing the clutch shifter mechanism and containing the outer end of the feed rod 44. A support plate 254 is attached over the opening to this chamber, and the base 255 of the motor is attached by screws 256 to this plate. The shaft 257 of the motor carries a clutch sleeve 258, having spline teeth in its outer end slidably engaged in spline teeth in the outer end of the element 225 pinned to the end of the feed rod. These elements are in constant clutching connection.

The lever 252, extended from the solenoid, is pivoted on a pivot pin 260, which is a part of the journal bracket 188. The lever includes a yoke 261 providing diametrically opposite contact lugs 262 which engage the outer face of a shifter collar 263, that is slidably mounted on the clutch sleeve and in engagement, through an end thrust bearing 264, with the outer end of the element pinned to the end of the feed rod. Accordingly, energization of the solenoid will swing the lever and declutch the clutch 168 of the feed rod. A time relay 265 and a circuit closing solenoid 266 complete the circuit to the motor and, consequently, return movement of the carriage will follow.

When the carriage has returned to the starting position the switch 240 will again be tripped to stop the rapid return motor.

*Description of the cycle of operation and the electrical circuit*

Assuming that the main drive motor is running and the work is mounted in the lathe, a cycle of automatic operation is started by means of the disk 106. Further, for reasons which will be obvious later, the carriage abutment element is resting against the first stop dog with the clutch disconnected and the switch 195 in feed-out position. It will also be apparent that the switch 155 will be in feed-out position where it had been left after the last outfeed movement of the slide in the last cycle of operation. When the starting disk is rotated, the lever 116 drops off the high point and permits the switch 60 to be spring urged to closed position.

Relay 270 has been energized previously and the current thereupon passes from the main line 271 through the feed-out contacts of switch 195, through lead 272, through the contacts 273 of switch 155, through lead 274, through the relay coil, and thence to main line 275 by way of lead 276. Since the relay 270 is energized, the circuit is closed to the infeed relay 277. The current passes from main line 271 through the feed-out contacts of switch 195, through lead 278, through the contacts of switch 60, and through the contacts 279 of the relay switch to the inwinding 280 of the motor 50.

The motor 50 then moves the slide into the work. As soon as the slide begins to move toward the work, switch 155 is spring-urged to its other set of contacts 281, and permits relay 270 to open. This, however, does not break the circuit to the inwinding of the motor since the coil of relay 277 is in shunt with the in-motor winding and current passing through the relay 277 holds the relay in position, closing the contacts 279.

The slide travels in until it reaches a positive stop; namely, the first of the stop dogs 121 of the assembly 55. The motor is then stalled, causing the motor current to increase to a value which will be strong enough to close the contacts of instantaneous current relay 136, the coil of which is in series with the in-motor winding and will permit the current to energize the coil of the contact closing relay 282.

The control circuit for this purpose travels from the inwinding 280 through lead 283, through the coil of relay 136, to the main line 275, closing contacts 284. The instantaneous current relay connects the current from main line 275, through lead 286, through the coil of the circuit closer 282, and thence by way of lead 287 to the main line 271.

The contact closer 282 connects contacts 288 thereof to permit current flow from the main line 275, through lead 289, through the coil of solenoid 137 to main line 271. The solenoid pulls the abutment element of the carriage off the particular stop dog against which it has been disposed at the beginning of the cycle, in which position it held the clutch that controls carriage feed, in open position.

Thereupon, the springs 174 and 175 move the clutch 168 into coupled position and carriage feed along the work begins. This same movement of the feed rod moves the switch 195 from carriage feed-out position to carriage feed-in position. Switch 195 thereupon breaks the circuit to the motor 50 and establishes the circuit to time relay 290, through the carriage feed-out contacts of switch 195, through lead 291, through the coil of the relay 290, to the main line 275, through lead 292.

When the carriage comes into contact with the next stop dog, the feed bar trips switch 195, throwing it from feed-in position to feed-out position. The clutch, which connects the power to the carriage, is disengaged at the same time. At this time, relay 290 is deenergized since the contacts of switch 195, which connect the current to the relay, are disconnected, and the relay is spring-urged to normally closed contact position after a time delay.

The closing of contacts 294 energizes the outwinding 280a of the motor 50. The current is connected to the outwinding of the slide motor through contacts 281 of the slide control switch 155, through lead 293, through the contacts 294 of the time relay, through lead 295, through the contacts 296 of relay 270, through lead 297, through the contacts 298 of the in-relay, and thence to the outwinding of the motor, through lead 299, and to the main line 275. This causes the slide to rapid traverse outwardly to the out-position.

When the slide reaches the extreme out-position, switch 155 will be tripped by means of the contact element 139 from slide-in to slide-out position, thus opening the out-contacts to stop the slide motor. Since the contacts 273 of switch 155 are then connected, relay coil 270 is energized, again establishing the circuit to the inwinding of the slide motor. From this point the operation is a repetition of that described heretofore and the repetitions will continue until the last stop is reached.

The contacts of switch 155 are arranged so as to permit overlapping. That is to say, when the switch blade engages contacts 273, as actuated by the slide against the pressure of the spring, it will still be in engagement or contact with contacts 281. This is necessary in order that the motor 50 continue to operate the slide through contacts 281, until contacts 273 are connected. Contacts 281, however, are in a dead line as soon as contacts 273 are connected, since the effect of the connection of contacts 273 is to operate the relay and break the circuit to the outwinding of slide motor 50.

Just before the last stop dog is reached, the bar 245 at the back of the lathe, operates the switch 240 to close the circuit to the carriage return motor 49. The circuit is closed to this motor through lead 300, energizing the coil of solenoid 251, and shifting the feed rod to declutch clutch 168 by means of lever 252. This disconnects the feed box mechanism from the shaft, and, at the same time, the current is connected through the switch 240 by way of lead 300, through lead 301, to the coil of a time relay 265, which will close the contacts 302 in lead 303, which connects to the coil of rapid traverse relay switch 266. Since the contacts 304 of this switch 266 are then closed, the current flows through lead 305 to the winding of the motor 49, and the carriage is rapidly returned.

When the carriage is moved back as driven by the motor 49 to a position beyond the end of the shaft being turned, switch 240 will be tripped again by the bar 245 to open the circuit to motor 49. At the same time, the coil of solenoid 251 will be deenergized, permitting the clutch springs to close the clutch on the feed rod, whereupon the carriage will be fed forwardly by means of the feed box and the main drive motor.

As soon as the carriage encounters the first stop dog, it will disengage the clutch on the feed rod, and, at the same time, will move switch 195 to feed-out position. In the meantime, the slide has moved out and moved switch 155 to feed-in position, connecting the contacts 273. Although the positions of switches 195 and 155 cause relay coil 270 to be energized the current is not connected to in-relay 277 for the reason that switch 60 is in circuit breaking position, and switch 60 is in circuit breaking position for the reason that the last cross slide out-movement had indexed the starting disk to circuit breaking position.

It will be understood that each time the slide moves out it is effective in its last phase of movement for indexing the slide control stop dog device for setting up the next stop dog controlling the infeed of the slide at the proper depth of cut on the next shoulder.

Figure 1:
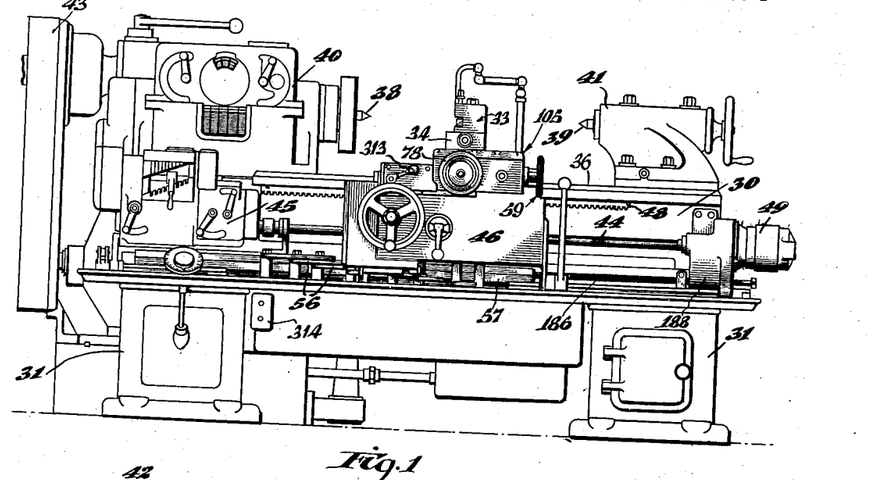
Figure 1 is a side view of the automatic lathe of this invention.
Figure 2:
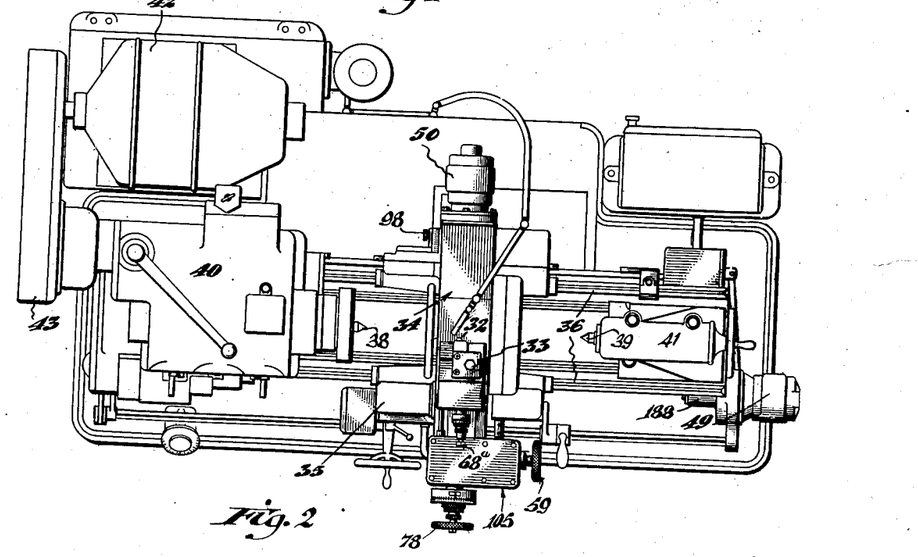
Figure 2 is a top plan view thereof.
Figure 3:
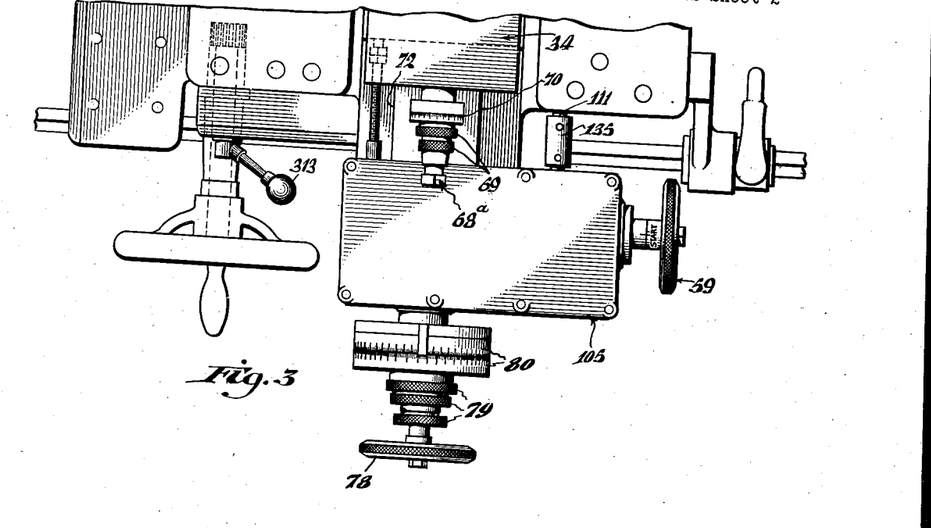
Figure 3 is an enlarged fragmentary top plan view of the forward end of the carriage.

The switch 100, which is actuated by the lever 98 at the back of the lathe, breaks the circuit to all of the automatic control circuits, but does not break the circuit to the main drive motor 42. An emergency switch 306 is provided on the front of the lathe (see Figures 1 and 22). As shown in the wiring diagram, this emergency switch breaks the circuit, not only to all the automatic control circuits, but to the main drive motor 42 as well. When this switch is closed, the undervoltage relay 307 connects the contacts 308 of main line 275. In the lead 309, which includes the emergency switch 306, and the undervoltage relay 307, a switch closing relay 310 is included, which connects the contacts 311 in a feed line 312, leading to the main drive motor. In the event that a tool should break or some other emergency should arise, the operator shifts the lever 313 of the switch 306 and the entire lathe stops, including the main drive motor. The main drive motor is separately controlled by means of switch 314. In the diagram, the power circuits are shown in heavy lines and the control circuits in light lines.

Having described my invention, I claim:

1. In an automatic lathe, a lathe bed, a carriage mounted for movement along the ways of said bed, clutch controlled means for traversing said carriage, stop means for controlling carriage feed, said stop means adapted to control said carriage traversing means, a cross slide on the carriage carrying a tool, a cross slide motor on the carriage, stop means on the carriage for limiting infeed of the slide, an electrically operated abutment element on the carriage, means controlled by the cross slide motor for operating said abutment element and disengaging it from said carriage stop means to permit reclutching of the carriage feed means and longitudinal feed of the cariage, a switch on the carriage actuated by the slide at its limit of out-travel, and a second switch operated by the feed rod, said switches effective for reversing the cross slide motor when carriage stop means is encountered, causing outfeed of the slide, said first named switch actuated by the slide effective for reversing the cross slide motor at its limit of outward travel.

2. In a lathe, a bed, a work turning spindle, a carriage and feeding means therefor, a tool cross slide mounted on said carriage, means for automatically turning work to a series of stepped diameters, including, automatic longitudinal carriage indexing means and automatic cross slide indexing means in cooperative relationship and adapted to determine the length and diameter respectively of each step to be turned, a normally deenergized carriage return motor, a power operated feed throw-out device, a switch on said carriage for said motor, and a pair of trip dogs on said bed, said dogs positioned at the limits of carriage movement for initiating and stopping carriage return, whereby, upon completion of the last turning operation said switch is tripped to energize said throwout device to disconnect said carriage feeding means and subsequently to energize said carriage return motor to return the carriage to starting position.

3. In an automatic lathe, a lathe bed including ways, a carriage adapted to be moved along said ways, a slide adapted to be moved across said carriage, work holding spindles for supporting a shaft, to be turned, longitudinally of said lathe bed ways, a tool on the slide adapted to be fed into the work, means for driving one of the spindles, positive stop means for limiting inward movement of the slide, an electric motor for traversing the slide, a clutch controlled transmission connection from the spindle driving means to the carriage, and electric relay operated means for connecting said clutch controlled transmission for longitudinal feed of the carriage when the slide engages said positive stop means and the slide motor is stalled.

4. In a lathe, a bed, a carriage slidable on said bed, a cross slide, carrying a tool, slidable on said carriage, means for traversing said slide, including a screw, a transmission and an electric motor, automatic means for controlling the operation of said electric motor, and a common manual lever for disconnecting the transmission and the automatic means.

5. In an automatic lathe, a lathe bed, a carriage mounted for movement along the ways of said bed, means for traversing said carriage, stop means for controlling carriage feed, said stop means adapted to disconnect the carriage traversing means, a cross slide on the carriage carrying a tool, a cross slide motor on the carriage, means for limiting infeed of the slide, means operated by said carriage infeed means for operating said carriage stop means, a switch on the carriage actuated by the carriage at its limit of out-travel, and a second switch operated by the feed rod, said switches effective for reversing the cross slide motor when the carriage feed is discontinued, causing outfeed of the slide, said first named switch actuated by the slide effective for reversing the cross slide motor at its limit of outward travel.

6. In a lathe having, a bed, a work turning spindle, a carriage, a feed rod in driving connection with said carriage, driving means for said feed rod, a clutch between said driving means and said feed rod and a tool cross slide mounted on said carriage; means for automatically turning work to a series of stepped diameters, including a normally deenergized carriage return motor in driving connection with said feed rod, a power operated clutch throw-out device, a switch, a pair of trip dogs on said bed, said dogs positioned at and determining the limits of carriage movement and in operative relationship with said switch whereby said switch is tripped to energize said throwout device to disconnect said carriage feeding means and subsequently to energize said carriage return motor to return the carriage to starting position, whereupon the second of said pair of dogs trips the switch to deenergize said carriage return motor and reengage said feed rod clutch.

7. In a lathe having a bed, a work turning spindle, a tailstock, a carriage, a feed rod extended along the bed and in driving connection with said carriage, a tool cross slide on said carriage, and a cutting tool mounted on said cross slide; means for turning work to a series of stepped diameters, including, driving means for said feed rod, a clutch on said feed rod, a normally deenergized carriage return motor in driving connection with said feed rod, a motor energizing switch on said carriage, a trip dog on said bed, a power operated throwout device for said feed rod clutch, whereby upon completion of the last turning operation said switch is tripped to energize said throwout device to uncouple said feed rod clutch and subsequently to energize said carriage return motor to return the carriage to starting position.

8. In an automatic lathe, a lathe bed, a carriage movable thereon, driving means for traversing said carriage, a stop dog bar having stop dogs mounted thereon, a displacable abutment means on the carriage, adapted to engage said stop dogs successively, said stop dog bar adapted to disconnect the drive to said carriage when a stop dog is engaged, means for reconnecting the driving means when the stop dog is disengaged, and an electrical means for displacing said abutment means on the carriage.

9. In an automatic lathe, a lathe bed, a carriage mounted for movement along the ways of said bed, a feed rod traversing said carriage, stop means for controlling carriage feed, said stop means adapted to disconnect the carriage feed rod, a cross slide on the carriage carrying a tool, a cross slide motor on the carriage, means for limiting infeed of the slide, means operated by said carriage infeed means for operating said carriage stop means, a switch on the carriage actuated by the carriage at its limit of out-travel, a second switch operated by the feed rod, said switches effective for reversing the cross slide motor when the carriage feed is discontinued for causing outfeed of the slide, said first named switch, actuated by the slide, effective for reversing the cross slide motor at its limit of outward travel, and indexing means for adjusting the means for limiting infeed of the slide, said indexing means operated by the slide at its limit of outward travel.

10. In a lathe, a tool feeding means, comprising a lathe bed, a carriage slidably mounted on said bed, a slide mounted on the carriage and carrying the tool, means for traversing the carriage, a feed box mechanism for operating said carriage traversing means in a feeding direction, an electric motor for driving said means for returning the carriage, a clutch in said traversing means, a switch on the carriage, adjustable switch operating elements on the bed at each end of the range of carriage movement, and motor circuit control means, said clutch and motor circuit control means operated by said switch for declutching the clutch and energizing the motor for returning the carriage.

11. An automatic lathe, comprising, a lathe bed, spindles mounted on said bed for supporting the shaft to be turned, means for driving one of said spindles, a carriage slidably mounted on said lathe bed, carriage driving means extended from the spindle driving means for moving the carriage along the ways of the lathe bed, a clutch in said carriage driving means, a cross slide on said carriage carrying the tool, an independent motor for driving said cross slide, adjustable stop means on the carriage for limiting in-feed of the slide by positive direct abutment, electrical means for causing clutching of the carriage driving means, substantially coincident with the stopping of the slide, a switch on the carriage operated by the slide limiting out-feed of the slide, and means indexing the slide stop means to the next position.

12. In a lathe comprising, a bed, a work turning spindle, a carriage and feeding means therefor, and a tool cross slide mounted on said carriage, means for automatically turning work to a series of stepped diameters including, a cutting tool mounted on said tool slide, a motor in driving connection with said tool slide, means for energizing said motor to start said slide in movement away from the work, a switch on said carriage, connecting means between said cross slide and said switch actuable to reverse said motor upon the outward limit of slide movement to initiate inward movement thereof, a stop cam on said carriage, a main circuit control switch in operative connection with said cam, connecting means between said cross slide and said cam operable upon outward movement of said slide to impart a partial revolution to said cam, and a lobe on said cam actuable to open said main circuit control switch upon completion of one revolution of said cam.

13. In a lathe, comprising, a bed, a work turning spindle, a carriage and feeding means therefor, and a tool cross slide mounted on said carriage; means for automatically turning work to a series of stepped diameters, including; a motor in driving connection with said tool slide, means for energizing said motor, to start said slide in movement away from the work, a switch on said carriage, connecting means between said cross slide and said switch actuable to reverse said motor when said slide reaches an outward limit of movement, a stop dog in the path of inward movement of said cross slide whereby upon contact of the slide with said stop dog said inward movement is arrested to stall said driving motor, and means for deenergizing said motor upon stalling thereof.

14. In an automatic lathe, a lathe bed, a carriage movable thereon, a cross slide on the carriage, electrical mechanism for controlling the movements of the carriage and the slide, a work spindle, an electric motor for driving said spindle, a switch for disconnecting the circuit to said motor coincidentally with the disconnection of the circuit to said electrical control mechanism, and a switch for disconnecting said electrical control mechanism independently of said motor.

15. In an automatic lathe, a lathe bed, a carriage adapted to be moved along said bed, a tool slide adapted to be moved across said carriage, a work holding spindle for supporting a shaft to be turned longitudinally of said lathe bed ways, means for rotating said spindle, means for blocking inward movement of the slide at a predetermined point, a motor for traversing the slide, means for driving said carriage, and means for causing longitudinal feed of the carriage when the slide is blocked and the slide motor is stalled.

16. In a lathe having a bed, a work turning spindle, a carriage and feeding means therefor, and a tool cross slide mounted on said carriage; means for automatically turning work to a series of stepped diameters, comprising, a series of carriage feed stops, one for each step length and spaced accordingly, a cross slide feed drum, a series of cross slide stops, one for each step diameter secured on said drum, a motor in driving connection with said cross slide, a switch operable to energize said motor, means operable to disconnect said carriage feeding means upon contact of the carriage with one of said carriage feed stops and subsequently to energize said switch and cross slide motor to move said cross slide outwardly, means for rotating and indexing said drum upon outward movement of said slide, to position the next successive cross slide stop in the path of inward slide movement, means for reversing said outward slide movement to reposition the cross slide against a stop, and means operative subsequently to reestablish the carriage feeding means.

17. In an automatic lathe, a lathe bed, a carriage movable thereon, a cross slide on the carriage, electrical mechanism for controlling the movements of the carriage and the slide, a work spindle, an electric motor for driving said spindle and a switch mechanism for disconnecting the circuit to said motor coincidentally with the disconnection of the circuit to said electrical control mechanism.

18. In an automatic lathe, including, the bed, the carriage slidably mounted on the lathe bed, and the tool slide on said carriage; an independent motor for driving said cross slide, positive stop means on the carriage for limiting in-feed of the slide by direct abutment, said stop means including a series of stops adjustable to position, a switch on the carriage operated by the slide limiting out-feed of the slide, and means actuated by the slide for indexing the slide stop means to the next position.

19. Apparatus for traversing the carriage of a lathe, including, the carriage and the bed upon which the carriage is slidably mounted, a tool slide on the carriage, a feed rod, driving mechanism for rotating said feed rod including, a clutch, an electric motor for driving said feed rod directly, switch means for placing said motor in and out of circuit and coincidentally declutching the feed rod from said driving mechanism at the end of full carriage movement, carriage operated stop means for disengaging said clutch at predetermined points in carriage movement, and electric means for displacing said carriage operated stop means when the slide moves inwardly a predetermined amount.

20. In a lathe, a tool feeding means, comprising, a carriage, a slide mounted on the carriage carrying a tool, a lathe bed slidably supporting the carriage, means for traversing the carriage, an electric motor for driving said means, a feed box mechanism for operating said carriage driving means in a feeding direction, a clutch in said driving means, a switch, electrically operated, clutch control means, and motor circuit control means, said respective means operated by said switch at either end of carriage movement for uncoupling the clutch when the motor is energized and vice versa.

21. In a lathe having a bed, a work turning spindle, a carriage and feeding means therefor, and a tool cross slide mounted on said carriage; means for automatically turning work to a series of stepped diameters, comprising, a series of longitudinal carriage feed stops, a series of cross slide stops, said stops determining respectively the length and diameter of each step to be turned, a motor in driving connection with said cross slide for feeding the same relative to said work, a switch in operative connection with said carriage feed stops for energizing said motor, means for disconnecting said carriage feeding means upon contact of the carriage with one of said carriage feed stops and energizing said switch and cross slide motor, thereupon to reposition the tool cross slide against a succssive cross slide stop, and means operable subsequently to reestablish the carriage feeding means.

22. Apparatus for controlling the movements of the cross slide of a lathe, including the slide and the carriage upon which the slide moves, a shaft disposed parallel to the slide and mounted in the carriage, a rotatable stop dog device mounted on the shaft and having the stop dogs radially disposed thereon and longitudinally adjustable, said slide including a stop adapted to engage an aligned one of said stop dogs, for limiting inward movement of said slide, means for deenergizing said slide motor when the stop is engaged, means for starting slide motor to feed the slide outwardly, and a shaft indexing mechanism on the carriage operated by said slide at its outer limit of motion for resetting said stop dog device.

23. Control means for the tool of a lathe, including the tool slide and the carriage supporting the slide, an electric motor for moving the tool slide, a clutch controlled feed rod for moving the carriage, carriage abutment means for operating said clutch, electrical means for operating said abutment means for permitting reclutching, positive abutment means for stopping inward movement of the slide at a predetermined point, and a relay actuated by said motor circuit upon motor stalling for operating said carriage abutment means to permit reclutching.

24. In an automatic lathe, a lathe bed, spindles for supporting a shaft, to be turned, upon said bed, an electric motor for driving one of said spindles, a carriage mounted for movement along the ways of said bed, a feed rod traversing said carriage, a clutch connecting said feed rod to said main driving motor, stop dogs for controlling carriage feed, said stop dogs adapted to operate the clutch, a cross slide on the carriage carrying a tool, a cross slide motor on the carriage, stop elements on the carriage for limiting infeed of the slide, a solenoid operated abutment element on the carriage, a relay controlled by the cross slide motor for operating said abutment element and disengaging it from a particular stop dog to permit reclutching of the feed rod and longitudinal feed of the carriage, a switch on the carriage actuated by the slide at its limit of out-travel, a second switch operated by the feed rod, said switches effective for reversing the cross slide motor when a carriage stop dog is encountered, causing out-feed of the slide, said first named switch, actuated by the slide, effective for reversing the cross slide motor at its limit of outward travel, a slide stop element indexing means operated by the slide at its limit of outward travel, and a main control switch in the indexing means effective for breaking the circuit to the tool slide motor when the last stop dog has been actuated.

25. In an automatic lathe, a lathe bed, a carriage adapted to be moved along said bed, a tool slide adapted to be moved across said carriage, work holding spindles for supporting a shaft, to be turned, longitudinally of said lathe bed ways, means for rotating one of the spindles, adjustable positive stop means for limiting inward movement of the tool slide, a motor for traversing the slide, power means for moving said carriage, means for connecting said power means to the carriage when the slide engages a positive stop and the slide motor is stalled said last named means including a clutch, a clutch disengaging abutment member actuated by the carriage, and an electrically displaced abutment means on the carriage for permitting reengagement of the clutch, said electrically displaced abutment operated by current value changes effected by stalling of the slide motor.

26. In an automatic lathe, a lathe bed, a carriage movable thereon, a tool slide movable on said carriage, a feed rod for traversing said carriage, a stop dog bar having stop dogs mounted thereon, a displaceable abutment means on the carriage, adapted to engage said stop dogs successively, a clutch operated by said stop dog bar adapted to disconnect the drive to said feed rod when a stop dog is engaged, spring means for reclutching the feed rod when the stop dog is disengaged, and an electrical means for displacing said abutment means on the carriage from said stop dog when the slide reaches a predetermined point.

27. In a lathe, a bed, a carriage slidable on said bed, a cross slide, carrying a tool, slidable on said carriage, means for traversing said slide, including a screw, a transmission and an electric motor, and a manual lever for disconnecting the transmission and the source of electrical energy to said motor coincidentally.

28. In a lathe, a bed, a work turning spindle, a tailstock, a carriage and feeding means therefor, a tool cross slide on said carriage, means for turning work to a series of stepped diameters, including, a shiftable carriage feed stop bar, a series of carriage feed stops secured on said bar, means associated with said bar to disconnect said carriage feeding means upon longitudinal shifting of said bar, a motor in driving connection with said tool cross slide, circuit control means controlled by shifting of said bar for initiating tool cross slide operation to reposition the slide and subsequently reestablishing said carriage feeding means, a normally deenergized carriage return motor associated with said carriage feeding means, a motor energizing switch on said carriage, a trip dog on said bed, a power operated throwout device for said carriage feeding means, whereby upon completion of the last turning operation said switch is tripped to energize said throwout device to disestablish said carriage feeding means and subsequently to energize said carriage return motor to return the carriage to starting position.

29. A control mechanism for an automatic lathe, comprising, a tool slide a tool slide motor, a two-position switch actuated by the cross slide at its outward limit of travel, a circuit closing relay controlled by said two position switch for connecting the circuit to said tool slide motor, and a control relay for the unwinding of the inwinding of the tool slide motor connected by the contacts of the last named switch and controlling the circuit to said inwinding of the tool slide motor, said relay effective as an interlock for maintaining the current supply to the inwinding when the tool slide switch is released.

30. Apparatus for traversing the carriage of a lathe, including, the carriage and the bed upon which the carriage is slidably mounted, a feed rod, a driving mechanism for said feed rod including a clutch, an electric motor for driving said feed rod directly, means for placing said motor in and out of circuit and coincidentally declutching the feed rod from the driving mechanism after full carriage movement, and carriage operated stop means for disengaging said clutch at predetermined points in the carriage forward movement.

31. In an automatic lathe, a lathe bed, spindles for rotatively supporting a shaft, to be turned, a slide carrying a tool for turning the work, stop dog means for positively limiting inward movement of the slide, a slide moving motor, and circuit breaking means for breaking the circuit to the slide moving motor, said means actuated by the increase in value of the motor current when the motor is stalled.

32. In a lathe including a bed, a work turning spindle, a carriage and feeding means therefor, and a tool cross slide mounted on said carriage; means for automatically turning work to a series of stepped diameters, comprising, a series of carriage feed stops, one for each step length and spaced accordingly, a cross slide stop drum, a series of cross slide stops, one for each step diameter, secured on said drum, a motor in driving connection with said cross slide, and electrical means adapted to initiate the repositioning movements of said cross slide subsequent to operation of one of said carriage stops and reestablishing said carriage feed upon completion of said repositioning movements.

33. A tool control means for an automatic lathe, including, the bed, the carriage mounted for movement along the ways of said bed, and a cross slide on the carriage carrying a tool; a cross slide motor on the carriage, stops on the carriage for limiting infeed of the slide, an electrically operated abutment element on the carriage, carriage feed disconnecting means operated by said abutment element, a relay controlled by the cross slide motor for operating said abutment element relative to said feed disconnecting means to permit longitudinal feed of the carriage, a switch on the carriage actuated by the slide at its limit of out-travel, a second switch operated by said abutment element, said switches effective for reversing the cross slide motor, when the carriage feed is stopped, for causing outfeed of the slide, said first named switch actuated by the slide effective for reversing the cross slide motor at its limit of outward travel, a slide stop indexing means operated by the slide at its limit of outward travel, and a main control switch in the indexing means effective for breaking the circuit to the tool slide motor when the last stop dog has been actuated.

34. In an automatic lathe, a carriage, a tool slide on said carriage, an independent motor for driving said cross slide, rotatably adjustable stop means on the carriage for limiting infeed of the slide, means for disconnecting the circuit to the motor when stalled against the stop means, a motor switch on the carriage operated by the slide limiting outfeed of the slide, and indexing mechanism rotating the stop means to the next position.

35. A control mechanism for an automatic lathe, comprising, a tool slide, a tool slide motor, a carriage feed control consisting of a feed rod declutched by carriage engagement and including a two-position switch, a two-position switch actuated by the cross slide at its outward limit of travel, circuit closing relays controlled by said two-position switches for connecting the circuit to said tool slide motor, a control relay for the inwinding of the tool slide motor connected by the contacts of the last named switch and controlling the circuit to said inwinding of the tool slide motor, said relay effective as an interlock for maintainnig the current supply to the inwinding when the tool slide switch is released, an instantaneous relay actuated by increase in current value in the infeed winding of the tool slide motor, and a carriage abutment release means energized from said instantaneous relay and adapted to reclutch the feed rod by releasing the same from the carriage and permitting carriage feed.

36. Apparatus for controlling the movements of the cross slide of a lathe, including the slide and the carriage upon which the slide moves; a shaft disposed parallel to the slide and mounted in the carriage, a rotatable stop dog device mounted on the shaft and having radially projected stop dogs longitudinally adjustably disposed thereon, said slide including a stop adapted to engage an aligned one of said stop dogs for limiting inward movement of the slide, a rod slidably mounted in the carriage and adapted to be abutted by the slide at its outward limit of movement, a rack, a bell crank lever pivotally mounted on the carriage and having one arm engaged by the rod and the other engaging the rack, a rack gear mounted on the shaft and a ratchet connection between said rack gear and said shaft for indexing said stop dog device upon each outward movement of the slide.

37. In a lathe having a work turning spindle, a tailstock, a carriage and feeding means therefor, and a tool cross slide on said carriage; means for turning work to a series of stepped diameters, including, a shiftable carriage feed stop bar, a series of carriage feed stops secured on said bar, a retractable contact element on said carriage adapted to contact said stops and shift said bar, a power operated element to retract said contact element, a switch in operative connection with said bar, means associated with said bar to disconnect said carriage feeding means and to actuate said switch upon longitudinal shifting of said bar, a motor in driving connection with said tool cross slide whereby, upon shifting of said bar, said switch initiates tool cross slide operation to reposition the slide and subsequently to retract said contact element to reestablish said carriage feeding means.

38. A control mechanism for an automatic lathe, comprising, a carriage, a tool slide on said carriage, a stop dog device for limiting inward slide movement, a tool slide motor, means indexing said device operated by said slide, a main control switch, a disk adapted to be indexed upon each outward slide movement, said disk adapted to open said main control switch after a certain number of slide movements, a carriage feed control consisting of a feed rod declutched by carriage engagement and including a two-position switch, a two-position switch actuated by the cross slide at its outward limit of travel, circuit closing relays controlled by said two-position switches for connecting the circuit to said tool slide motor, an inwinding control relay connected by the contacts of the cross slide actuated switch controlling the circuit to the inwinding of the tool slide motor and effective as an interlock for maintaining the current supply to the inwinding when the tool slide switch is released by the slide, an instantaneous relay actuated by increase in current value in the inwinding of the tool slide motor, and a carriage abutment release means energized from said instantaneous relay for reclutching the feed rod and permitting carriage feed.

39. In a lathe, a bed, a work turning spindle, a carriage and driving means therefor, a tool cross slide mounted on said carriage, a rotatable cross slide stop drum, a series of cross slide stops secured on said drum, indexing means associated with said drum operable to dispose successive cross slide stops in the path of slide movement, a motor in driving connection with said cross slide for actuating the same in outward and inward movements, connecting means adapted to impart a partial revolution to said drum upon outward movement of said cross slide, a limit switch on said cross slide for reversing its direction of travel upon reaching the outward travel limit, and means for deenergizing said cross slide motor upon engagement of said slide with one of said cross slide stops upon inward travel.

40. In an automatic lathe, a lathe bed, a carriage adapted to be moved along said bed, a tool slide adapted to be moved across said carriage, work holding spindles for supporting a shaft to be turned longitudinally of said lathe bed ways, means for rotating one of the spindles, adjustable positive stop means, means for limiting inward movement of the slide, a motor for traversing the slide, means for moving the carriage, and means for causing longitudinal feed of the carriage when the slide engages said positive stop means and the slide motor is stalled, means for returning the slide when the carriage has traveled a predetermined amount, and an indexing device for the positive stop means on the carriage actuated by the slide at its outward limit of travel.

WILLIAM G. HOELSCHER.